United States Patent [19]

Simon

[11] 4,019,649
[45] Apr. 26, 1977

[54] SAFETY TANK SYSTEM

[76] Inventor: Sidney Simon, 936 Oranmore St., Pittsburgh, Pa. 15201

[22] Filed: Oct. 20, 1975

[21] Appl. No.: 624,161

Related U.S. Application Data

[63] Continuation-in-part of Ser. No. 550,589, Feb. 19, 1975, Pat. No. 4,000,726.

[52] U.S. Cl. .................................. 220/88 B; 62/45; 220/9 A; 220/85 S; 220/20.5
[51] Int. Cl.² .................. B65D 25/00; B65D 25/18
[58] Field of Search ............ 220/88 R, 88 B, 85 S, 220/63 A, 23.83, 20, 20.5, 9 A, 9 LG; 62/45

[56] References Cited

UNITED STATES PATENTS

| | | | |
|---|---|---|---|
| 2,404,418 | 7/1946 | Walker | 220/63 A X |
| 3,030,780 | 4/1962 | Loveday | 220/9 LG |
| 3,548,931 | 12/1970 | Germer et al. | 220/9 A X |
| 3,698,200 | 10/1972 | Johnson et al. | 62/45 |

*Primary Examiner*—William Price
*Assistant Examiner*—Steven M. Pollard
*Attorney, Agent, or Firm*—Gipple & Hale

[57] ABSTRACT

A gasoline safety tank system utilizing at least one safety tank, each safety tank comprising a tank body with interchangeable inlet and outlet fittings secured to the tank body, an intermediate container mounted in the tank for holding gasoline, and a carbon dioxide bottle mounted in the intermediate container. A conduit is connected to the inlet fitting and extends into the intermediate container adjacent the floor of the intermediate container and below the level of liquid placed in the intermediate container. A pressurized carbon dioxide bottle is selectively connected to the inlet fitting and adapted to discharge pressurized carbon dioxide gas into the intermediate container so that the gas bubbles up through the liquid in the intermediate container into the top of the intermediate container simultaneously cooling the liquid and pressurizing the liquid in the intermediate container. The carbon dioxide bottle is also connected to the tank to pressurize a foam placed in the space defined by the outer wall of the intermediate container and the inner wall of the tank so that the foam will be expelled from the tank when the tank wall is punctured.

21 Claims, 3 Drawing Figures

SAFETY TANK SYSTEM

CROSS REFERENCE TO THE RELATED APPLICATION

This is a continuation-in-part of application Ser. No. 550,589 filed Feb. 19, 1975, now U.S. Pat. No. 4,000,726.

BACKGROUND OF THE INVENTION

The invention generally relates to containers for combustible liquids and more specifically relates to a safety storage tank which is constructed so that the explosion hazards inherent in the design of such a tank are eliminated allowing the storage tank to be used in an automobile, airplane, motor boat, or other moving vehicle or simply as a storage device.

The safety storage tank is normally used for the storing of volatile fuels such as gasoline. In ordinary conditions of the storage of gasoline, air usually enters the tank as the gasoline is removed from the tank. Under such conditions the upper part of the partially filled tank contains a dangerous explosive mixture of gasoline vapor and air. If a spark occurs in the upper part of the tank through an electrical discharge of static electricity or from contact with other structures fire and explosion will result.

The present invention eliminates this explosive hazard by unique construction of the tank in that the air is replaced in the space above the gasoline by an inert gas such as carbon dioxide which is heavier than air and which will not form an explosive mixture with the gasoline. The carbon dioxide is pressurized and attached to the tank so that it automatically replaces the gasoline as it is expended from the tank.

The invention is also provided with a release valve which will allow excess pressure and air from inside the tank to escape thus preventing a vacuum from forming in the tank. A pressure indicating gauge is connected to the release valve or to the tank to indicate to the operator or owner of the tank the current pressure in the tank.

DESCRIPTION OF THE PRIOR ART

It is known in the prior art to place an inert gas in a storage tank to alleviate the explosive characteristics of the tank. U.S. Pat. No. 2,153,555 discloses a tank in which the area in the space above the gasoline is replaced by an inert gas which is carbon dioxide. In this patent the gasoline is withdrawn by a pipe (not shown) and the carbon dioxide is used to fill the vacuum created in the tank by the discharged gas. A similar system is shown by U.S. Pat. No. 2,406,373 which discloses a fixed fuel vapor purging apparatus with a vapor diluting medium such as carbon dioxide under pressure. Another system is shown by U.S. Pat. No. 3,606,079 which teaches that there is a danger of an explosion in such a tank through the accumulation of static electricity built up by the incoming inert gas in the tank. This patent teaches that static electricity can build up into a spark discharge especially when gas input velocity is high and the carbon dioxide is derived from a source in liquid or solid state such as that housed in the tank of the present invention. This problem is solved by the use of a fixed emergency discharge facility which eliminates the spark discharge through the use of a complex bath expansion chamber mounted on the roof of the tank.

In any of the above described tanks a puncture of the tank will result in the pressurized gas propelling the gasoline out of the tank in a high pressure stream.

If this stream of fuel is ignited by a spark, static electricity, heated manifold or other fire inducing medium the result is much like a flame thrower in that all areas in the path of the fuel stream are ignited by a burning fuel. Thus while the danger of fuel explosion has been decreased within the tank the danger of combustion outside the tank is greatly increased upon rupture of the tank. The present invention overcomes this problem by providing a safety tank which significantly eliminates the danger of internal and external combustion.

SUMMARY OF THE INVENTION

The present invention utilizes a specific construction so that the combination of the carbon dioxide with the gasoline and the input of carbon dioxide overcomes previous problems found in the prior art. In the present invention the carbon dioxide conduit inside the tank body extends below the surface of the liquid fuel or gasoline to cool the fuel and discharge static electricity carried by the gas before the gas contacts the vapor zone of the tank. In addition, the gas flow conduit serves as both a carbon dioxide gas flow conduit and a fuel carrying conduit depending upon its intended use. When the conduit operates to carry carbon dioxide gas, the gas is bubbled up through the gasoline cooling the gasoline and thereby keeping the fuel vapors down.

This under liquid ejection prevents the heavier carbon dioxide from forming an air lock, thus preventing one source of explosion. When the conduit operates as a fuel conduit, the carbon dioxide previously entrained in the pipe when the tank was initially pressurized operates as a safety device against leakage when attached to a quick disconnect coupling since the carbon dioxide will be expelled before the gasoline thus making it easier to determine leakage before gasoline leakage actually takes place.

Furthermore the use of a carbon dioxide foam compartment through the novel design of the tank reduces the danger from puncture of the outer tank wall and acts as a fire extinguisher if an outer blaze arises. If the gasoline or inner fuel container is also punctured the foam mixes with the fuel to retard combustion of the fuel as it is expelled into the atmosphere.

The system itself is a portable pressurized system of tanks with the gas fuel flow line being selectively adapted to engage a gas source such as a carbon dioxide container or a fuel receiving receptacle to form an interchangeable interlocking pressure system with one or a plurality of units.

The invention will further be described with reference to the accompanying drawings of which:

DETAILED DESCRIPTION OF THE DRAWINGS

Figure 1:
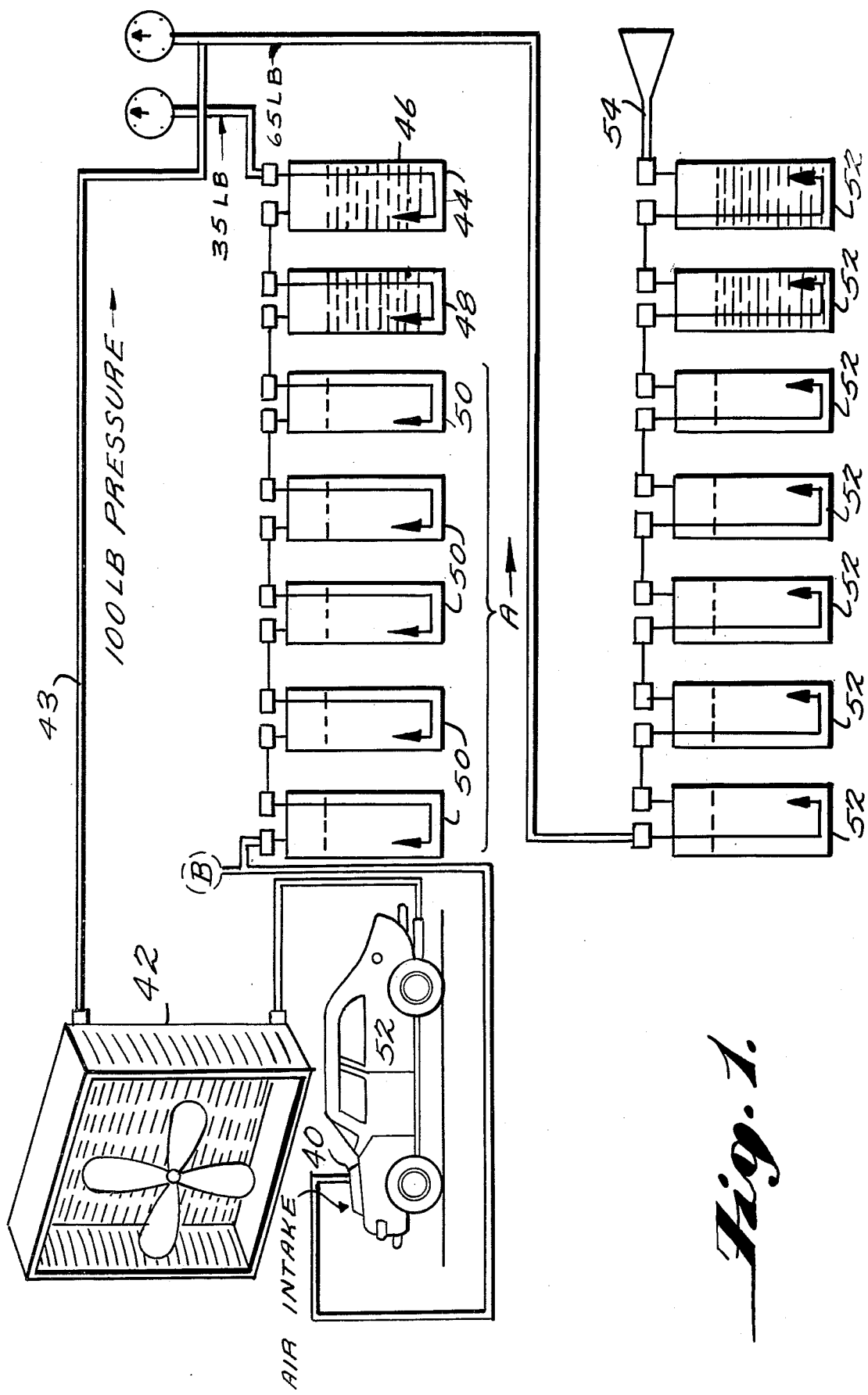
FIG. 1 discloses a schematic utilization of a tank system of the invention partially in perspective.

The present invention as shown by the drawings discloses a safety tank 10 comprising a tank body 60, an intermediate smaller diameter cylindrical shaped container 62 mounted within the body 60 and a gas pressure container 64 mounted in the cylindrical shaped container 62. While the present invention in its preferred embodiment is constructed of these basic compartments the intermediate container can be integrally formed with the outer wall of the tank to form a doubled walled tank. The intermediate container or inner wall of the double walled tank can be provided with a seat or support to hold the gas pressure container. Alternatively the tank 10 can be provided with a removable manifold 11 which can be screwed onto the tank body. While such a manifold would be used to provide easy access to the inner container it is envisioned that the intermediate container 62 and/or gas pressure container could be mounted to the manifold for support.

The intermediate cylindrical shaped container must have a wall thickness which provides suitable support to maintain gasoline contained therein under 100 psi pressure. While it has been found that the invention has worked well under a 60 psi pressure the intermediate container should be capable of holding at least a 250 psi pressure. Thus any material such as plastic or metal which would be able to withstand pressures of this magnitude and not be effected by the corrosive nature of the various volatile fuels would be acceptable.

Two carrying handles 70 are provided upon the upper or outer surface of the tank body 60 for facilitating transportation of the portable tank.

A gasoline inlet valve 72, is built within and is flush with the upper surface of the intermediate container 62. The valve is able to receive a funnel, through which gasoline may be poured for filling the tank. Two gauges, 74 and 76, are mounted to the center of the gas pressure container 64 by gauge conduit 78. The upper gauge 74 indicates the exiting gas pressure, and is provided with a screw for adjusting the pressure of the exiting gas. The other gauge 76 indicates the internal cylinder pressure of the gas being held under pressure.

Four quick disconnect couplings 80, 82 84 and 86 are provided on the upper surface of the tank body 60. Disconnect couplings 80 and 82 are mounted on the upper surface of the tank body above intermediate container 62 and extend into the interior of the intermediate container 62. The couplings are used for the inlet and outlet fitting for the intermediate container. Conversely disconnect couplings 84 and 86 provide inlet and outlet fittings for the tank body interior. An L-shaped conduit 87 with an extension 88 extends down into the interior of the intermediate container 62 from disconnect coupling 82. The extension or leg 88 is substantially parallel to the bottom of the intermediate container and carries gas into the intermediate container 62 so that the exiting gas rises from a level beneath the gasoline level 90. The source of the gas to be carried within the conduit 87 may be from an exterior gas source but is preferably from an internally housed source.

In operation, gasoline or any other volatile liquid is poured into the intermediate container 62 through a valve 72 which functions as a vapor bleed-out valve for the intermediate container. The gasoline level is indicated by line 90. Carbon dioxide, nitrogen, foam or any other suitable inert gas is provided in the inner container 64 by prefilling the container from an exterior source of gas and inserting the container or cartridge into the tank. A compartment 63 formed by the inner surface of the tank body and outer surface of the intermediate container is filled with and pressurized by a combination of foam and an inert gas such as carbon dioxide through disconnect couplings 84 and 86. A vapor bleed-off valve can be connected to one of the disconnect couplings to allow air to escape to the atmosphere.

Gasoline can be transported out of the tank to another tank or receptacle by connecting the interior cylinder 64 to the intermediate disconnect coupling 80 by a flexible coupling hose. The carbon dioxide passes from the interior container 64 through the flexible coupling hose 82 to the disconnect coupling 80 and then through the L-shaped conduit 87 of the intermediate container 62. The interior container 64 or carbon dioxide bottle is adapted to cause carbon dioxide to flow at a high or low flow rate into the tank depending upon the position of an adjustment screw 26. The intermediate container 62 communicates with the carbon dioxide bottle so that the cold carbon dioxide passes into the gasoline tank by going through the inlet into conduit 87 and bubbling up through the gasoline or volatile liquid to the top of the intermediate container.

When the carbon dioxide comes into the bottom of the tank the gas vapors rise opening a pre-set pressure bleeder valve 73 in the outlet letting the excess air out so that there will be no air locks. The pre-set pressure bleeder valve 73 is connected to the gasoline inlet valve 75. Since the air is lighter than the carbon dioxide the air will be forced upward and out of the bleeder valve. The elimination of air locks cuts down the potential of explosions. The bubbling of the carbon dioxide through the L-shaped conduit 87 cools the volatile liquid and prevents the occurrance of a gasoline vapor-carbon dioxide environment in the top of the intermediate container since the cooler the gasoline the lower the vapor pressure. This further eliminates possible explosions when spark discharges occur. Furthermore, the gasoline provides an effective means of discharging static electricity within the intermediate container as the static electricity is carried from the incoming carbon dioxide to be discharged within the liquid. Thus there is no build-up of static electricity causing a discharge spark to go into the vapor which is a highly explosive area. A gauge is placed on the connection so that the pressure of the gas on the gasoline or the pressure under which the gasoline is placed can be quickly determined. One or more tanks may be interlocked together by flexible conduits and used with their own pressure. Thus an interlocking pressurized system can be formed.

In operation, gasoline or other volatile liquid intended to be stored within the tank is dispensed into the intermediate container 62 through the gasoline inlet valve 72. The flexible coupling hose 66 is then connected to the disconnect coupling 82 of the L-shaped conduit 87 and carbon dioxide is used to pressurize the gasoline contained within the intermediate cylinder. Pressure bleeder valve 73 is opened so as to allow excess, lighter than carbon dioxide, air to escape. The flexible hose is then connected to coupling 84 to pressurize the foam held within compartment 63. The flexible coupling hose 66 is then connected to coupling 80. If gasoline is intended to be poured from the storage tank, then a valve on coupling 82 is opened and gasoline can be poured through L-shaped conduits 87 and coupling 82. The carbon dioxide from the gas pressure cylinder 64 will replace the gasoline so poured.

The pressure of the incoming carbon dioxide gas fills the volume of the intermediate container 62 as the gasoline is poured through the valve 72.

The carbon dioxide gas in the interior cylinder may be at an elevated temperature. This heat is dissipated as the carbon dioxide gas is being passed through conduit 87.

Thus the pressure of the carbon dioxide prevents and retards the formation of volatile gas vapors.

Should the tank body 60 become punctured, rupturing only the tank wall, then the foam and inert gas of compartment 62 will merely emanate through the puncture at a high pressure. The intermediate container 62 and the interior gas container 64 will remain, however, under pressure independently and therefore cause no danger to the surrounding environment. If the puncture should cause a hole through both the tank wall and the intermediate container, then the volatile gas liquid would be forced by pressure through the rupture hole at the external intermediate container wall interface to contact the foam held in the compartment. The foam and the volatile gas will become thoroughly mixed as the foam acts upon the volatile liquid and when the mixture exits through the puncture in the tank wall the mixture will be relatively safe non-volatile neutralized substance.

Figure 2:
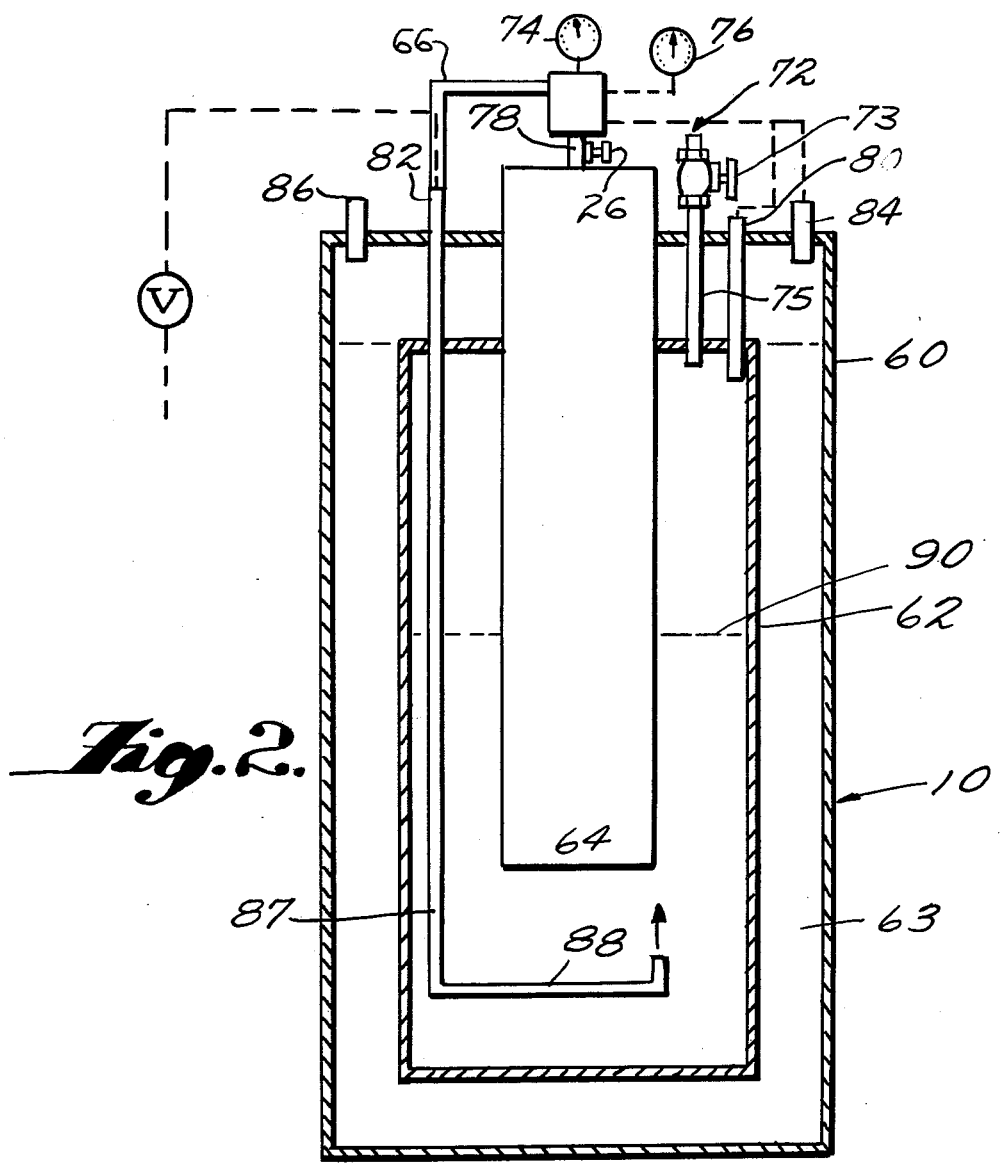
FIG. 2 shows a schematic cross-sectional view of a storage tank.
Figure 3:
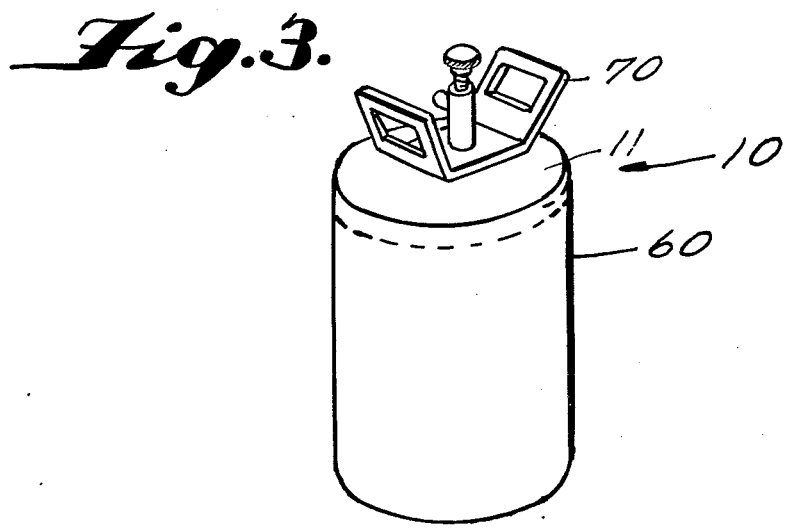
FIG. 3 discloses a perspective view of the storage tank.

The tanks of FIGS. 2 and 3 can be hooked up in series of tanks as is shown in FIG. 1 so that gasoline can be passed from one tank to another without opening up any of the tanks to the atmosphere. The gasoline is transferred from one tank to the next tank through the L-shaped conduits 87 so that the gasoline can, for example, be passed from one ship to another or from a ship to a tank car. Furthermore volatile fuel can be passed from one train car to another without opening any of the pressurized cars so that a safe and efficient transfer is accomplished.

The system as is shown in FIG. 1 discloses carbon monoxide fed into a series of tanks. The carbon monoxide bubbles up through a plurality of gasoline filled tanks to provide a fuel laden vapor which passes into a carburetor 40 or other suitable device where it is subsequently ignited.

After the vapor fuel has been ignited the exhaust gases, which contain carbon monoxide as a constituent are passed through a radiator 42 which cools the gas. The cooler gas is carried by conduit 43 to a point along the conduit where the exhaust gas is apportioned through suitable valving in relation to its pressure. A portion of the exhaust gas as is arbitrarily shown in recirculated into the containers 44, 48 and 50, as will be subsequently discussed. The remainder portion of the exhaust gas is fed by a conduit into a series of water containers 52. The exhaust gas, passing through the water tanks, picks up additional water vapor and oxygen vapor as the gas continues to pass through each successive tank. Consequently the exhaust product as purified passes through a valve 54 where it finally exhausts to the atmosphere.

The water filtering tank 44 contains water 46 to clean the carbon monoxide of carbon and associated solids and other undesirable resultant vapors.

The exhaust gases bubble up through the water from the bottom of the tank, cleans the gases while creating an oxygen vapor at the top of the tank above the water surface. A second tank 48, connected to the top of the filtering tank contains a dryer filter of cotton or other suitable composition which will take the water out of the oxygen enriched vapor which has passed from the filtration tank 44. A plurality of gasoline tanks 50 connected in series and containing gasoline communicate with the dryer tank 48. As the gas is bubbled into each successive gasoline tank, the resulting vapor mixture is enriched as each successive gasoline tank acts as a booster. When the oxygenized vapor is bubbled through the first gasoline tank 50, an insufficient gas vapor mixture, for combustion purposes, is formed at the top of the tank. The second gasoline tank 50, in series, increases the combustion quality of the fuel mixture with the third tank of the series forming the critical booster in which a gas vapor mixture of sufficient quality is formed so that an effective combustion level is reached. When the bubbling vapor gas has proceeded through the fourth tank and has reached the top of the fifth tank for entrance to the carburetor 40 or other fuel mixing system an almost 100% effective burn is achieved upon ignition in the automobile 52. Thus the five gasoline tanks generate a vapor fuel mixture of gasoline, oxygen, and vaporized hydrocarbons to give a superior combustion fuel.

If desired the cleaning and filtration process can be accomplished by utilizing standard air filtration means in tank 44. It is apparent of course, that a filter cartridge or other removable filter can be easily inserted in the tank so that a manifold containing the quick disconnect couplings can be lifted off the tank for easy replacement of the filtration system.

Thus it can be seen that many commercial uses are readily adaptable from the present invention in the transfer of volatile fluids from various areas and also in the transfer of volatile fluids for combustion.

What is claimed is:

1. A gasoline safety tank system comprising a double walled tank body, a manifold removably secured to said tank body, inlet means mounted to said manifold, outlet means mounted to said manifold, said inlet means and outlet means being interchangeable and adapted to receive and discharge fluid, a conduit connected to said inlet means and extending into the area formed by the inner surface of the inner wall of said tank body adjacent the floor of said tank body, a pressurized gas source means mounted to said manifold and selectively connected to said inlet means to discharge pressurized inert gas into said inner surface through said conduit so that said inert gas bubbles up through the liquid in said inner surface into the top of said tank cooling said liquid and pressurizing the liquid in said tank, said double walled tank body forming a cylindrical compartment filled with an incombustible material which is adapted to be pressurized and transported from said compartment when said compartment has a pressure differential greater than that of the outside atmosphere and communicates with the outside atmosphere.

2. A gasoline safety tank as claimed in claim 1 wherein said inert gas source is adapted to communicate with said compartment to pressurize said compartment.

3. A gasoline safety tank system as claimed in claim 1 wherein said conduit is L-shaped with the bottom leg of the L being substantially parallel to the bottom of said inner surface.

4. A gasoline safety tank system as claimed in claim 1 wherein said inlet means and said outlet means have quick disconnect means.

5. A gasoline safety tank system as claimed in claim 1 wherein said incombustible material is a liquid foam.

6. A gasoline safety tank system as claimed in claim 1 comprising a plurality of interconnected tanks.

7. A gasoline safety tank system as claimed in claim 1 wherein said pressurized inert gas source means comprises a pressurized carbon dioxide bottle.

8. A gasoline safety tank system as claimed in claim 7 wherein said pressurized carbon dioxide bottle includes a flexible discharge hole for discharging the carbon dioxide from said bottle, said flexible discharge hose being provided with a quick disconnect nozzle adapted to fit in said inlet means and said outlet means.

9. A gasoline safety tank system as claimed in claim 8 wherein said inlet and outlet means quick disconnect sections mate with the quick disconnect nozzle of said carbon dioxide flexible discharge hose and a fluid discharge conduit mounted in one of said inlet and outlet means quick disconnect connections to communicate with said conduit.

10. A gasoline safety tank comprising a tank body, an intermediate container contained within said tank body, an interior container containing an inert gas under pressure mounted in said intermediate container, inlet and outlet means secured to said intermediate container, said inlet and outlet means being interchangeable and adapted to receive and discharge fluid, a conduit connected to said inlet means and extending into said intermediate container adjacent the floor of said intermediate container, said interior container comprising a pressurized gas source means selectively connected to said inlet means and adapted to discharge pressurized inert gas into said intermediate container through said conduit so that said inert gas can bubble up through the liquid contained in the intermediate tank in series connected to a filtration means container into the top of said intermediate container to pressurize the liquid in said intermediate container, and pressure released means connected to said outlet means.

11. A gasoline safety tank as claimed in claim 10 wherein said pressure release means comprises a relief valve and a pressure gauge connected to said pressure relief valve.

12. A gasoline safety tank as claimed in claim 10 wherein said conduit is L-shaped with the bottom leg of the L being substantially parallel to the bottom of said cylindrical container.

13. A gasoline safety tank as claimed in claim 10 wherein said inlet means and said outlet means have a quick disconnect construction.

14. A gasoline safety tank as claimed in claim 13 wherein said inlet means and outlet means have two way valves mounted thereto.

15. A gasoline safety tank as claimed in claim 10 wherein said interior container comprises a pressurized carbon dioxide holding container.

16. A gasoline safety tank system as claimed in claim 10 wherein said intermediate container and tank body define foam holding compartment.

17. A portable safety tank comprising a tank body, an intermediate container mounted inside said tank body, an interior container mounted in said intermediate container, means on said intermediate container to receive a volatile liquid into its interim, said interior container containing a pressurized inert gas heavier than air, a conduit connecting said interior container to said intermediate container, a second conduit connecting said interior container to said tank body, and a fire resistant foam material placed in a compartment defined by the inner surface of said tank body and the outer surface of said intermediate container.

18. A gasoline safety tank as claimed in claim 17 wherein the pressured inert gas is carbon dioxide.

19. A gasoline safety tank as claimed in claim 17 including a conduit connected to an inlet formed in said intermediate container said conduit being L-shaped with the bottom leg of the L being substantially parallel to the bottom of said intermediate container.

20. A gasoline safety tank as claimed in claim 17 wherein the pressurized inert gas is nitrogen.

21. A gasoline safety tank as claimed in claim 17 wherein the pressurized inert gas is foam.

* * * * *